United States Patent Office 2,843,689
Patented July 15, 1958

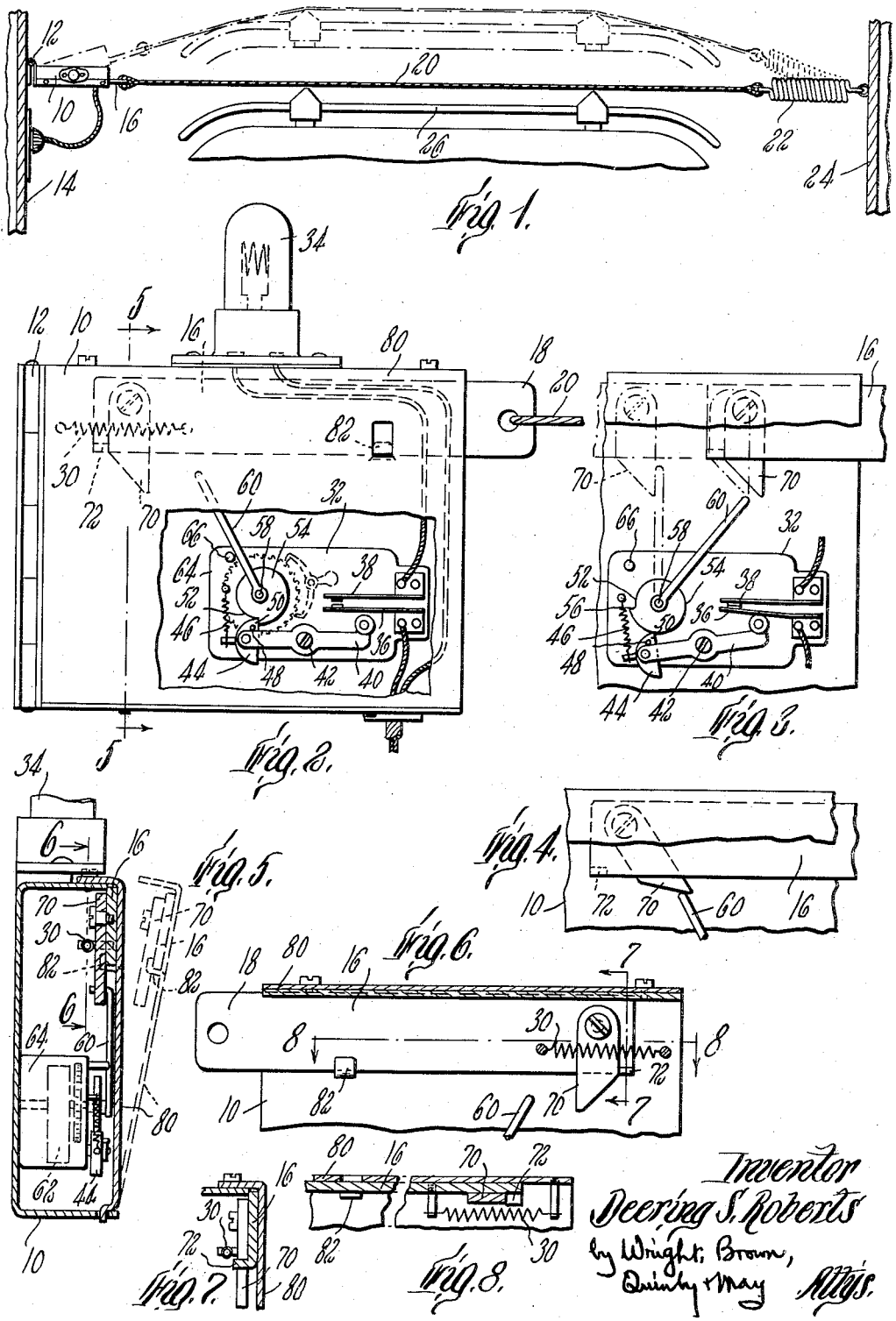

2,843,689

DEVICE FOR TEMPORARILY CLOSING A CIRCUIT

Deering S. Roberts, Marshfield, Mass.

Application June 7, 1954, Serial No. 434,884

4 Claims. (Cl. 200—61.41)

This invention relates to a device for closing an electric switch and automatically opening the switch after a predetermined interval. More particularly the invention relates to apparatus which, for example, can be installed in a private garage to be operated by an entering automobile to close an electric switch which may control a conveniently placed light. The closing of the switch also starts the operation of a delayed-action device for automatically opening the switch after a predetermined interval. Thus when an automobile is driven into the garage, a light or series of lights go on and stay on long enough for the driver to unload the car, shut the garage doors, get to the house, or do anything else he may wish to. After a predetermined interval, the lights go off.

For a more complete understanding of the invention, reference may be had to the following description thereof, and to the drawing, of which—

Figure 1 is a plan view of the device installed;

Figure 2 is an elevational view, on a larger scale, of the operating mechanism of the device, a portion being broken away to show interior elements;

Figure 3 is an elevational view similar to a portion of Figure 2, but with the parts in a different position of operation;

Figure 4 is a fragmentary portion of the view shown in Figure 2, with the parts in a different position of operation;

Figure 5 is a section on the line 5—5 of Figure 2;

Figure 6 is a section on the line 6—6 of Figure 5;

Figure 7 is a section on the line 7—7 of Figure 6; and

Figure 8 is a section on the line 8—8 of Figure 6.

The electric switch and operating mechanism therefor are housed in a suitable box 10 which is pivotally mounted by means of a hinge 12 on a wall 14 or other suitable support. One part of the switch operating mechanism is a tension member in the form of a bar 16 which is slidably mounted in the box 10 and has an end portion 18 projecting horizontally outward from the box. The end of the bar 16 is connected by a flexible strand 20 to a helical spring 22 which in turn is fastened to the opposite wall 24 or other support preferably at the same level as the bar 16. If, for example, the installation is in a private garage, the strand 20 is stretched across the garage at a height at which it will be engaged by the bumper 26 of an automobile when the latter has entered the garage and reached its customary position therein. Forward movement of the automobile a few inches to the position indicated in broken lines in Figure 1 after the first contact of the bumper 26 with the strand 20 results in tension on the spring 22 and on the bar 16 against the retracting force of a spring 30 which is attached at one end to the box and at the other end to the bar 16. The spring 22 is somewhat stronger than the spring 30 so that when the strand 20 is pushed by the bumper 26, the bar 16 is drawn further out of the box for a limited distance after which any further extension of the connection between the garage walls is by the elongation of the spring 22. Since the box 10 is hinged to the wall it can swing in accordance with direction of pull of the strand 20. Hence the bar 16 does not cock or bind in the box.

The box 10 also contains an electric switch 32 which is connected in series with a lamp 34 or group of lamps located wherever desired. For convenience the lamp 34 is shown in Figure 2 as being mounted on the box 10. The switch itself may be of conventional construction including two contacts 36 and 38 which are normally separate but are moved together by a lever 40 which is pivoted at 42. One end of the lever 40 has a rockable cross-head 44 which is urged in a clockwise direction by a spring 46 to its normal position which is determined by a pin 48 therein engaging a side of the lever 40. The cross-head 44 has a nose 50 which usually engages a low spot 52 on a disk cam 54 and bears against a shoulder 56 at the low spot. The cam disk 54 is mounted on a shaft 58 on which is also mounted an arm 60. The shaft 58 is connected by a clock-work gear train to a spiral spring 62 mounted in an inner case 64 within the box 10. The spring 62 and gear train are arranged to urge the arm 60 in the counterclockwise direction to bear against the stop pin 66. If the arm 60 is swung in the clockwise direction and released, the spring 62 returns it to the normal position shown in Figure 2. Such action is delayed by a suitable escapement mechanism in the inner case 64 which may for example be similar to the mechanism employed in a toaster.

The end portion of the arm 60 is in the path of a latch member 70 which is pivotally mounted on the bar 16 and hangs from its pivot. A stop 72 is provided on the bar 16 to prevent the latch 70 from swinging clockwise beyond the normal position shown in Figures 2 and 3. When the bar 16 is drawn outward by the strand 20, the latch 70 rocks the arm 60 to the position shown in Figure 3. As the arm 60 rocks, the cam 54 rotates with it and the shoulder 56 pushes against the nose 50 of the cross-head 44, rocking the cross-head against the tension of the spring 46 until the nose is clear of the shoulder and permits the spring 46 to snap the cross-head back to its normal position relative to the lever 40. Meanwhile the movements of the cam 54 and cross-head 44 have rocked the lever 40 so as to close the switch 36, 38. Assuming that the switch is in a live circuit, the lamp or lamps light up and remain lighted until the switch opens. When the latch 70 moves past the arm 60 as indicated in Figure 3, the arm is released to be returned to its normal position by the spring 62. This returning movement is slowed by the escapement mechanism so that any predetermined time interval elapses during such movement. The switch 36, 38 is held closed by the nose 50 engaging on a high portion of the disk 54 (Figure 3) until the shoulder 56 reaches the nose 50 and permits it to drop into the low spot 52 of the cam. The spring 46 thereupon rocks the lever 40 to open the switch and extinguish the lights.

The bar 16 remains in its projected position until the automobile is backed from its parked position. The bar is then retracted by the spring 30 to the normal position shown in Figure 2. During such movement of the bar, the latch 70 which has moved beyond the arm 60 (Figure 3) easily rocks on its pivot (Figure 4) to move past the arm.

For access to the parts of the apparatus which are in the box 10, the front wall 80 of the box may be a removable cover (Figure 5). As shown, the bar 16 and spring 30 may be carried by the cover 80, a guiding and supporting lug 82 being struck up to maintain the bar against the inner face of the cover 80. The inner case 64 and apparatus associated therewith may conveniently be attached to the box itself.

I claim:
1. A device of the class described, comprising a box, hinge means for attaching said box to a support, an electric switch mounted in said box, tension means extending from said box, switch-closing means in said box operable by outward movement of said tension means to close the switch, delayed-action means for operating independently of said tension means to open said switch after a predetermined interval of time following the closing thereof, and an extensible spring attached to the remote end of said tension means and attachable at its other end to a support.

2. A device of the class described, comprising an electric switch, means for operating said switch, and means for pivotally attaching said switch and operating means to a support, said operating means including a tension member outwardly movable to close said switch, said operating means also including means for automatically opening said switch while said tension member is in its outward position at the end of a predetermined time interval following a closing of said switch.

3. A device of the class described, comprising a box, hinge means for attaching said box pivotally to a support, an electric switch in said box, means in said box operable to close said switch, said switch means including a bar slidably mounted in said box, said bar having a portion projecting from said box in a direction away from said hinge, a retracting spring attached to said bar, a lever mounted in said box and rockable in one direction to close the switch, cam means operable to rock said lever to close the switch, a latch carried by said bar and arranged to operate said cam means to close the switch when the bar is drawn outward, clock-work means in the box for operating said cam means in the reverse direction to open the switch after a predetermined interval of time following a closing thereof, and a flexible strand attached to the outer end of said bar.

4. A device as in claim 3, and a tension spring attached to said strand.

References Cited in the file of this patent

UNITED STATES PATENTS

| | | |
|---|---|---|
| 1,064,926 | Nielsen | June 17, 1913 |
| 2,054,502 | Hallett | Sept. 15, 1936 |
| 2,102,246 | Weiss | Dec. 14, 1937 |
| 2,282,132 | Halton et al. | May 5, 1942 |
| 2,454,896 | Traub | Nov. 30, 1948 |